Jan. 11, 1966     R. HACKENFORT     3,229,281
MAGNETIC-FIELD-OPERABLE CHANGEABLE SYMBOL SYSTEM
Filed March 26, 1963     3 Sheets-Sheet 1

INVENTOR.
ROBERT HACKENFORT
ATTORNEYS

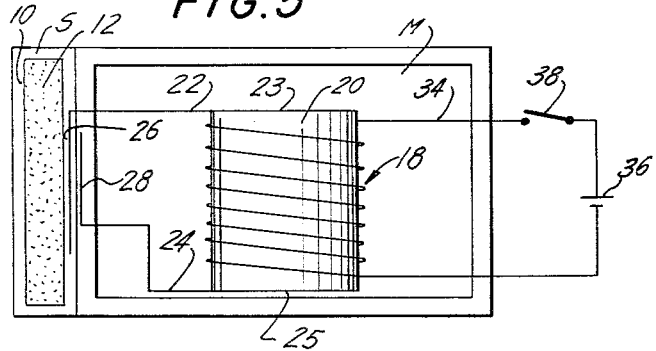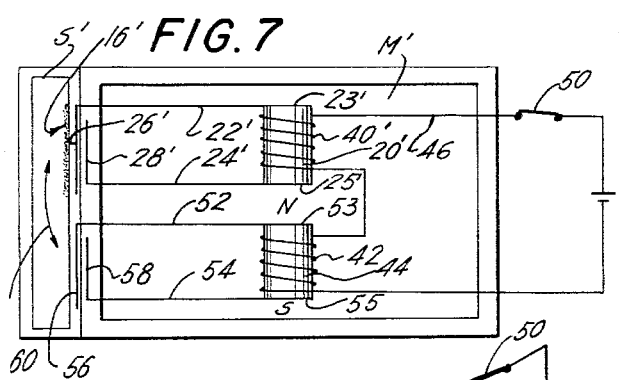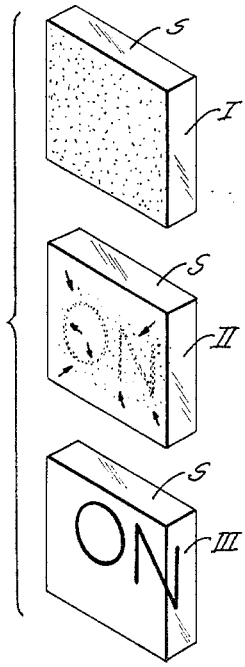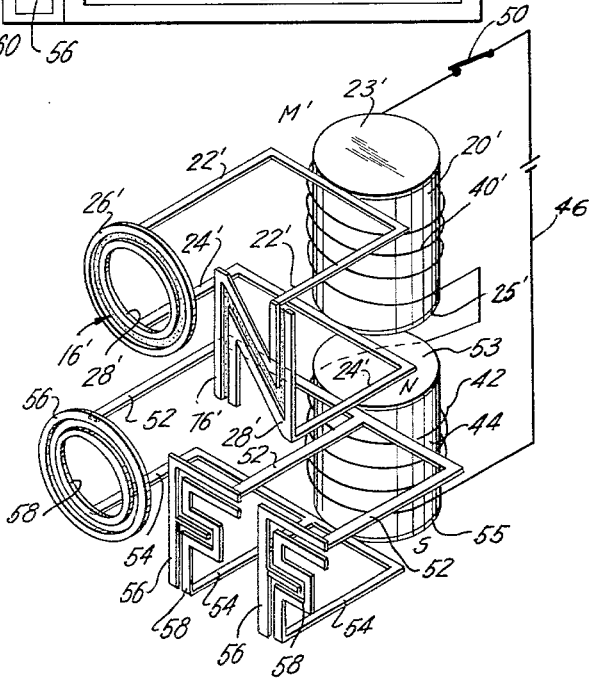

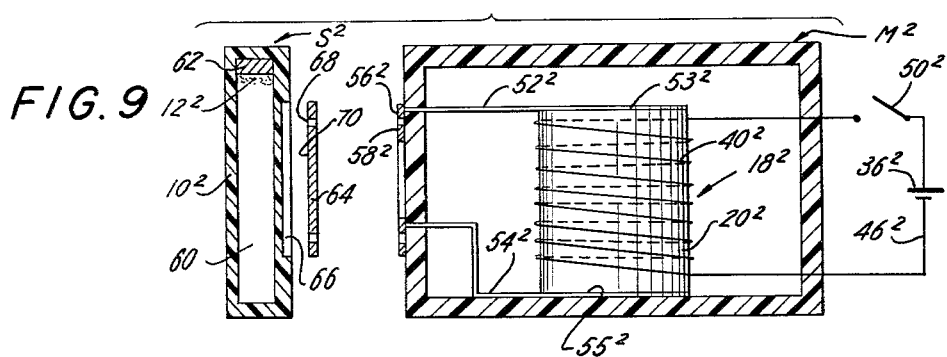
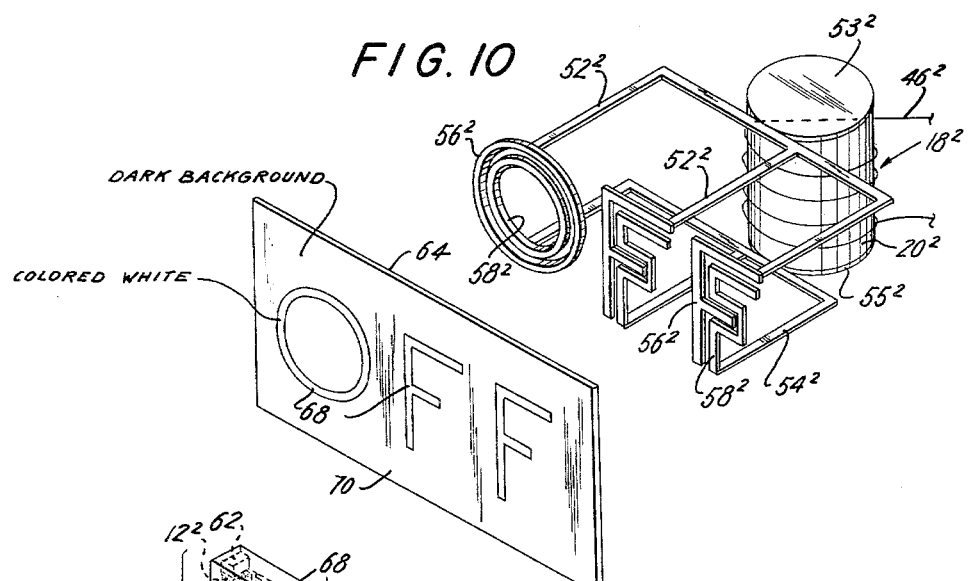
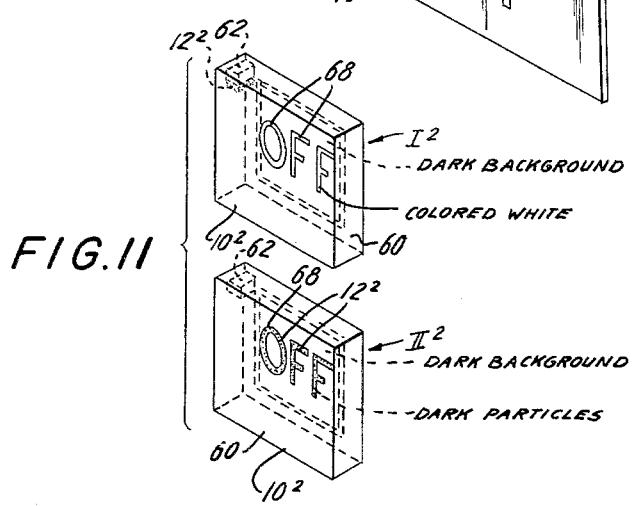

United States Patent Office 3,229,281
Patented Jan. 11, 1966

3,229,281
MAGNETIC-FIELD-OPERABLE CHANGEABLE SYMBOL SYSTEM
Robert Hackenfort, Brentwood, N.Y., assignor to Magnetoscopics Inc., Jamaica, N.Y., a corporation of New York
Filed Mar. 26, 1963, Ser. No. 268,034
15 Claims. (Cl. 340—373)

The present invention relates to a system or apparatus for displaying and changing a symbol by the excitation of a magnetic field.

Symbol displaying devices of a type to which the present invention is typically serviceable find widest application to aircraft (usually military) control or instrument panels. Modern aircraft control systems require the use of servomechanisms in order to properly actuate the alteration of control surfaces, fire control system, landing gear systems and inertial or guided navigational systems. It is desired that when individual systems are in some state of being, exact knowledge of which is necessary, an indication of this condition be presented to a control or instrument panel. The signal presentation usually takes the form of written word statements such as "ON," "OFF," "GO," "STOP," etc., or may take the form of the presentation of a numerical digit and/or simple geometric patterns.

The display or indicating device now generally in use is an electromechanical "rotating component" device, which, upon passage of current through a coil winding, produces a desired rotation in a rotating component member. This rotating member is mechanically coupled (usually by simple, i.e., direct connection) to a flag bearing the symbolism. A window is provided in a viewable panel such that the flag may be moved into view thereby providing the appearance of the information signal.

This system of symbol presentation has several inherent disadvantages, namely: (a) the mechanical members employed have considerable inertia, thus limiting the time response of the device, (b) the device has moving parts and therefore requires periodic servicing of bearings, etc., (c) the device cannot be completely encapsulated and is therefore not highly reliable; this also stems from fact that moving members are included in the device, and (d) such electromechanical devices are not compatible with environmental extreme of temperature, shock, vibration and acceleration without severe restrictions on usable life.

The principal object of the present invention is the provision of a display or indicating system in which electromechanically movable members are eliminated and in which the symbol presentation is effected or produced by the creation or excitation of a magnetic field.

In the system of the present invention, there is provided a magnetic circuit having a magnetic field creating means in the form or configuration of the desired symbol, which magnetic circuit is combined with a viewable holder containing suspendible magnetizable particles in a liquid medium, the symbol configuration of the magnetic circuit being positioned in magnetizing relation to the magnetizable particles in the holder. Upon magnetizing or energizing the magnetic circuit, a magnetic field is created in or at the symbol configuration such that the magnetizable particles in said liquid medium migrate toward and agglomerate at the created magnetic field of said symbol configuration to produce a viewable change in said symbol.

To the accomplishment of the foregoing object and such other objects as may hereinafter appear, the invention relates to the magnetic-field-operable changeable symbol system as sought to be defined in the appended claims taken together with the following specification and the accompanying drawings, in which:

FIG. 5 is a diagrammatic view of the assembled device of FIG. 3;

FIG. 6 is a view, shown in perspective, explanatory of the operation of the system;

FIG. 7 is a diagrammatic view of a modification of a device embodying the system of the invention;

FIG. 8 is a perspective view of the magnetic circuit component of the said modification;

FIG. 9 is a diagrammatic view of a further modification of a device embodying the system of the invention;

FIG. 10 is a perspective view of parts of the system of FIG. 9; and

FIG. 11 is a view, shown in perspective, explanatory of the operation of the system of FIG. 9.

Figure 1:
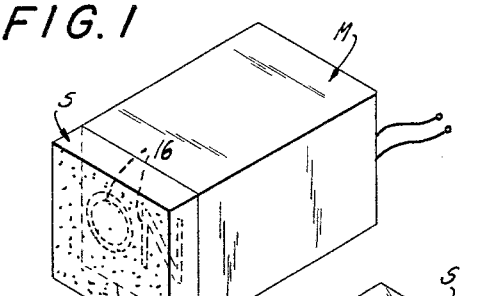
FIG. 1 is a perspective view of the external appearance of an assembled device embodying the system of the present invention.
Figure 2:
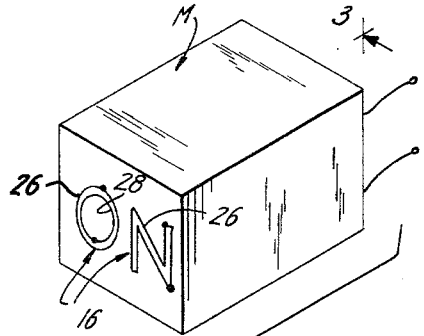
FIG. 2 is a perspective view similar to FIG. 1 and showing the two component parts of the assembly separated.
Figure 3:
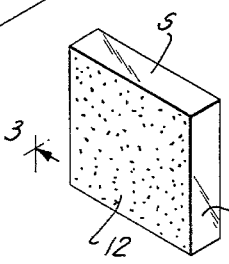
FIG. 3 is a view, on an enlarged scale, taken in cross-section in the plane of the line 3—3 of FIG. 2, showing the internal structure of the device.
Figure 3:
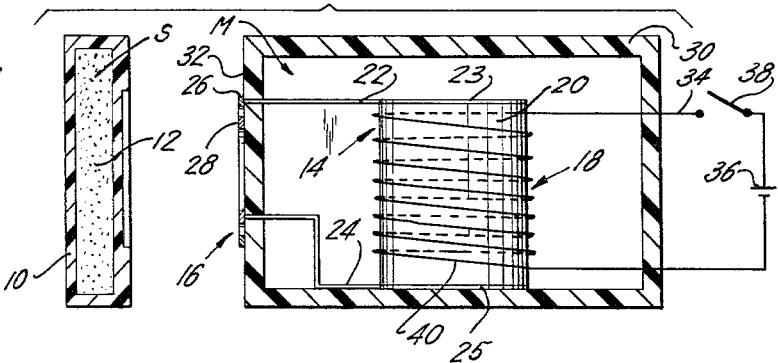

Referring now more in detail to the drawings and having reference first to the form of the device shown in FIGS. 1 to 4 thereof, the device embodying the system of the invention comprises a magnetic circuit component generally designated as M and what may be briefly referred to as a suspension or colloidal component generally designated as S, shown separated in FIGS. 2 and 3 and shown assembled in FIG. 1 of the drawings. The suspension component S comprises a viewable holder 10 preferably made of a transparent plastic material such as an epoxy resin, containing a suspension or colloid 12 of magnetizable particles in a liquid medium; and the magnetic circuit component M comprises a magnetic circuit 14 provided with a magnetic field creating means generally designated as 16 in the configuration of a symbol, the suspension component S and the magnetic component M being assembled as depicted in FIG. 1 so that the symbol configuration or element 16 is positioned in magnetizing relation to the suspension 12 in the holder 10.

Figure 4:
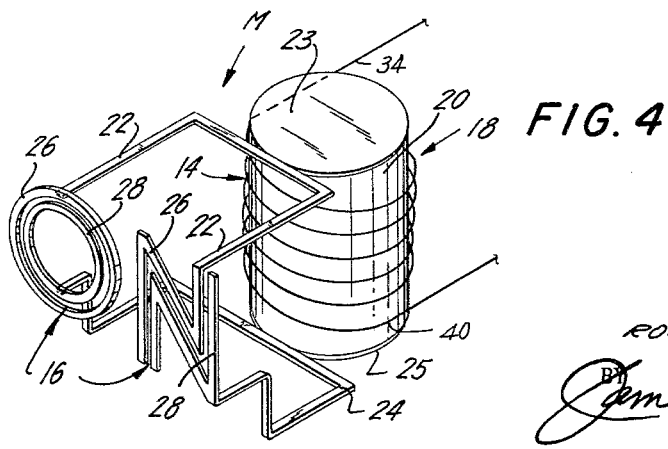
FIG. 4 is a perspective view of the magnetic circuit component of the system.

The magnetic circuit component M may be best explained by reference to FIG. 4 of the drawings. The magnetic circuit of this component comprises an electromagnet 18 having a core 20, to the opposite poles of which are attached elements 22 and 24 forming part of the magnetic circuit and terminating in a magnetic field creating means which in the embodiment shown comprises spaced magnetic poles 26 and 28, which, more particularly the magnetic field between which poles, define a desired symbol configuration or element. In the structure illustrated in FIG. 4 the symbol configuration or element comprises a plurality of characters, namely the letters O and N defining the word signal "ON."

The magnetic circuit component M is completed by mounting the described magnetic circuit in a holder or container 30 also preferably made of a plastic material such as an epoxy resin. The symbol elements 26, 28 of the magnetic circuit are mounted on as by being adhesively secured to the front face 32 of the holder 30 and the remaining parts of the magnetic circuit are mounted within the holder 30, the elements 22 and 24 of which are conductively attached at their termini to the symbol elements 26 and 28, as clearly shown in FIG. 3 of the drawings. The electromagnet 18 is controlled by an electric circuit 34 comprising a source of energy 36 and a controlling switch 38 located exteriorly of the holder 30, the leads of which extend into the holder and are attached to the coil 40 of the electromagnet. Preferably the contents of the holder 30 are encapsulated by and sealed within the holder; and to this end the holder before being sealed is filled with a suitable plastic also preferably an epoxy resin.

With the components M and S assembled as shown diagrammatically in FIG. 5 of the drawings, operation of the circuit 34 effects the desired symbol presentation. The creation of the magnetic field at the symbol elements 16 by the closing of the electric circuit 34 and the resulting imposition of this magnetic field (which defines the symbol) upon the suspension or colloid 12 results in a reaction somewhat similar to the effect obtained when iron filings are sprinkled on or near the field of a permanent magnet. The magnetizable particles of the suspension will attempt to respond to the imposed magnetostatic force and will migrate through the mother liquor to those points of highest magnetic flux density. This results in the simultaneous agglomeration of particles about one or more magnetic poles and the reduction of colloidal particle concentration in the mother liquor. The observable reaction at the front of the device is to convert a uniformly dark suspension into a considerably lighter, almost water transparent vehicle, where the transposed colloidal particles have formed a dark agglomeration representative of the desired symbolism.

The action that takes place may be best described in connection with FIG. 6 of the drawings. In the quiescent state illustrated in I, where the suspension is a colloidal one, the colloidally suspended particles are subject to Brownian motion, and the result is a partially or wholly opaque suspension field. Upon energization of the magnetic circuit, magnetic flux lines grow across the symbol. The suspended particles are now subjected to an essentially magnetostatic force which causes them to migrate as indicated by the arrows in illustration II from positions of colloidal stability to the symbol elements, these particles arranging themselves in a manner to minimize potential energy of the system. Upon the completion of all the migrations, encompassing most, if not all, the particles present, the particles have arranged themselves in greatest density in the region of intense magnetic field. This yields a clear and contrasting representation of the desired symbol, as indicated in illustration III. Upon the relaxation or de-energization of the magnetic circuit, the magnetostatic forces produced by the field are no longer present. Consequently, the colloidal nature of the particles is reasserted and they return to the suspended state indicated in illustration I.

In the device disclosed, an economy of construction is afforded in that the symbol elements used are laid out by the use of highly permeable ribbon 22, 24, 26 and 28 (e.g. permalloy, supermalloy, relay steel #5), the ends 23 and 25 of which ribbons (see particularly FIGS. 3 and 4) are placed across and attached to the opposite poles of the electromagnet 18. In the illustrated device the ribbons have a width of 1/16" and a thickness of .010". Such ribbon, being an excellent conductor of magnetic flux, conducts the flux as if it were a direct extension of the electromagnet.

The preferred magnetizable particle used in the suspension component is colloidal magnetite, a suspension subject to Brownian motion, composed of submicron diameter particles of the magnetic oxide of iron. Other magnetic colloids serviceable are: submicron particles of ferrites, principally the ferrites of nickel, barium and manganese; and finely powdered and suspended particles of permalloy, magnetic steels.

A wide range of selection exists with regard to the choice of the liquid medium or mother liquor used. The choice of the mother liquor depends upon the device performance characteristics desired. It is apparent that a viscous fluid will more nearly approximate a true colloid, but at the same time, will restrict response time of the suspended particles owing to viscous damping. In addition, environmental considerations may well dictate the use of fluids whose viscosities do not detrimentally alter with temperature extremums. A preferred material to be used as the mother liquor or liquid medium is silicone oil or fluid (polysiloxane fluids). Other liquors known to permit proper operation of the system are refined petroleum, either paraffin or mineral base; alcohol, ethyl or methyl; glycerine or any related group having the approximate viscosities; water; common organic solvents, such as: benzene, xylene, toluene, chloromethane, automotive gasoline; vegetable base oils, such as peanut oil, olive oil, corn oil; liquified Freon (difluorodichloromethane); mercury, and ethylene glycol and ethylene diglycol.

A wide range of operating power levels is permissible. However, for a rather small sized symbol a field strength of approximately 15 oerstads is sufficient to effect good symbol definition. A field of this magnitude, for a symbol presenting a 1/8 inch air gap, 1½ inches in length would require approximately 4 amp-turns of magnetomotive force. This implies, for a coil of 200 turns, a current requirement of 20 milliamperes. The power required would therefore be in the order of ½ watt.

There is no limitation as to the nature of the symbol(s) to be presented. There are, however, certain engineering steps allowable for the improved presentation of the symbolism together with added simplicity of construction. In order to prevent straying of the magnetic field applied to the magnetic colloid and/or dispersion, the symbol elements are arranged such that a north and south pole is provided within each symbol in order that the entire magnetic field be contained therein. This accomplishes a considerable reduction in stray or fringe field effects which tend to reduce symbol definition. Further, since average distances between north and south seeking poles will be reduced, stronger fields result from the currents impressed. This provides for a larger magnetic force to be exerted upon the colloidal and/or dispersed particles, thereby increasing the acceleration of said particles in the region neighboring the magnetic poles. An increase in the acceleration of such particles will result in further reduction of response time for the device.

In FIGS. 7 and 8 of the drawings a modification of the device is shown wherein a plurality of word symbols is employed with means for selectively operating the magnetic circuit component to cause a change in display from one symbol to the other in response to the selective operation of the circuit. In this modification the symbol elements comprise the word signals "ON" and "OFF." Where it is desirable to use the symbols "ON" and "OFF," the system may be made fail-safe in that the symbol "OFF" would be displayed without requiring an activation energy of any kind. This may be accomplished by means of a solenoidal winding 42 placed onto a permanent magnet member 44 and electrically in series connection by the electric circuit 46 with the solenoidal winding 40' placed on a non-permanent or electromagnetic member 20' such that closing the switch 50 of the electrical circuit and producing an energizing current creating the desired symbol "ON" will simultaneously result in the reversible demagnetization of the permanent magnetic member 44, thereby destroying the "OFF" symbol for such time as the activating current is applied.

In the magnetic circuit system (M') shown in FIGS. 7 and 8 the magnetic circuit for the symbol element "ON" is the same as that depicted for the embodiment shown in FIGS. 1 to 4 of the drawings and the corresponding parts are designated by similar (but primed) reference characters. The magnetic circuit for the symbol element "OFF" comprises the branched ribbon elements 52 and 54 terminating in magnetic field creating means defining the letters of the symbol, which in this modification embodiment comprises for each symbol letter spaced magnetic poles 56 and 58, which, and more particularly the magnetic field between which poles, define the desired symbol, the ribbon elements 52 and 54 terminating at their inner ends at elements 53 and 55 attached to the opposite poles of the permanent magnet 44.

In diagrammatic FIG. 7, which shows the said magnetic component M' assembled to a suspension component S', the poles (e.g. 26' and 28') defining the symbol for diagrammatic purposes, are shown axially displaced but it will be understood that these pole elements of the magnetic circuit are arranged in the same plane as best depicted in FIG. 8. A similar displacement of the pole elements (26, 28) is shown also for diagrammatic purposes in FIG. 5 of the drawings. The suspension used in the embodiment of FIGS. 7 and 8 need not be of the colloidal variety. This is obvious from the fact that the quiescent state requires the particles to be agglomerated about one of the symbol elements presented. Thus, no reliance is placed on the ability of the colloid to remain suspended and, therefore, a colloidal suspension is not necessary in this embodiment. Virtually any magnetic material which can be finely powdered and does not react detrimentally with the mother liquor is applicable to this embodiment.

The action of the system of this embodiment may be described in the following steps: In the quiescent state, with the circuit 46 open, the colloidal or dispersed particles are agglomerated about the symbol element "OFF" by virtue of the permanent magnet 44 supplying flux to the symbol. Upon excitation of the solenoid winding 40', by closing the switch 50, current is made to flow in a direction such that the resultant field of the solenoid 42 tends to demagnetize the permanent magnet 44 associated with symbol element "OFF" and simultaneously by the solenoid 40' effect the magnetization of the soft iron core 20' associated with symbol element "ON." The particles previously agglomerated about the symbol element "OFF" are no longer subjected to the "permanent" magnetostatic force. Instead, the particles are subjected to the force exerted by the field about symbol element "ON" and a migration (see arrow 60 in FIG. 7) to the symbol element "ON" is effected similar to that heretofore described in connection with the system of FIGS. 1 to 6, resulting in the symbol becoming visible in the magnetic field 16' as is depicted in both FIGS. 7 and 8. Upon relaxation or de-energization of the system, the field associated with the symbol element "ON" decays. Similarly, the demagnetizing field acting on the permanent magnet associated with symbol element "OFF" decays, allowing the permanent magnet to spontaneously remagnetize. This effect requires the use of highly anisotropic material exhibiting a single hysteresis loop. A material such as barium ferrite is ideal for this purpose. Other materials also useful fall into the class of compounds and alloys known as "square loop" materials. It is essential that the material chosen have only one permissible hysteresis loop so that so-called minor loops will not be traced out, ultimately demagnetizing the permanent magnet. The particles are now once again subjected to the magnetostatic force associated with symbol "OFF" and effect the same agglomeration as was characterized by the quiescent state delineating the symbol "OFF."

To enhance the visibility of the symbol indications the plastic wall 32 of the container 30 may be composed of a plastic material (e.g. epoxy resin) filled with a phosphorescent and/or fluorescent material, this in order to further emphasize the contrast of the symbol against the back face. For the same purpose, the compartment of the holder 30 may be filled with an epoxy resin containing suitable pigments, in particular pigments which are of a phosphorescent or a fluorescent nature. As the means for creating the magnetic field, instead of employing a magnetic flux conducting ribbon terminating in magnetic poles, a good conductor of electric current may be used embodying at the field producing means a symbol made up of the conductor, reliance being then had on the circumferential magnetic field in the current carrying conductor which would then define the required symbolism.

In FIGS. 9 to 11 of the drawings, a further modification of the device is shown wherein, upon creation of the magnetic field at the symbol, the migration and agglomeration of the magnetizable particles in the liquid medium causes the symbol to become invisible instead of visible.

In this modification, the magnetic circuit component $M^2$ is like the magnetic circuit component M of FIG. 3, with, however, the use of the symbol "OFF" as depicted in the lower half of FIG. 8; and the corresponding parts thereof are designated by reference characters similar to those applied to FIG. 3 and FIG. 8, distinguished therefrom, however, by the exponent 2. The suspension component $S^2$ is like that of the suspension component S of FIG. 3, and the parts are designated by similar reference characters distinguished by the exponent 2, except that the viewable holder $10^2$ contains a normally clear liquid medium 60 and carries a permanent magnet 62, the magnetizable particles $12^2$ being normally attracted to and conglomerated on the permanent magnet 62.

In this modification, there is provided a signal plaque 64 arranged in advance of the symbol $56^2$, $58^2$, which plaque may be placed in the recess 66 of the holder. This plaque is a printed plaque, bearing an image 68, of the symbol, namely the signal "OFF," in brightly colored letters (such as in white or yellow color) printed against a contrasting, such as a black background 70, the plaque being interposed between the symbol $56^2$, $58^2$ and the holder $10^2$ so that the image 68 of the symbol is arranged in aligned juxtaposition to the magnetic field of the symbol $56^2$, $58^2$, as best shown in the exploded view of FIG. 9 and in the offset view of FIG. 10 of the drawings.

The action of the system of this embodiment may be described in connection with FIG. 11 of the drawings. In the quiescent state illustrated in $I^2$, the magnetizable particles $12^2$ are agglomerated at and held by the permanent magnet 62. Since the liquid medium is a water-white transparent mother liquor, the printed image 68 is clearly visible against the dark background 70. This quiescent state is thus made to indicate an "OFF" signal. When the circuit $46^2$ is energized, and a magnetic field is created between the symbol poles $56^2$ and $58^2$, the magnetic particles $12^2$ are drawn off the permanent magnet, and they migrate towards and agglomerate at the created magnetic field, with the result that they cover the printed image 68, as illustrated in $II^2$ of FIG. 11. The image is, therefore, rendered black, and becomes invisible against the black or dark background 70. This condition or state is made to indicate or be interpreted as the opposite of "OFF," namely to represent an "ON" signal. When this circuit $46^2$ is deenergized, the particles are drawn away from the printed image and the image again becomes visible to indicate the "OFF" signal.

The use and operation of the described system will, it is believed, be fully apparent from the above detailed description. The salient advantages offered by the system of the present invention are (a) the device is essentially impervious to excessive humidity and fungus and may be easily constructed to operate in high vacuum, (b) the structure has no moving parts in the usually accepted manner, and, therefore, will reflect this fact by increased reliability, (c) the device has the feasibility of being packaged in extremely small dimensions with no preferential mounting position, (d) the speed of symbol presentation and subsequent image retention will not be deleteriously effected by mechanical motions, i.e., large values of sustained acceleration, shock and vibration, (e) the operation over wide temperature ranges is possible by choosing the mother liquor suitable to operating environment, (f) the device will operate perfectly in zero gravity conditions of space, and (g) operation of the device is possible at excitation current frequencies from D.C. to a minimum of several kilocycles.

It will be apparent that many changes may be made in the construction and arrangement of the parts of the system without departing from the spirit of the invention defined in the following claims.

I claim:

1. A magnetic-field-operable symbol system comprising a viewable holder containing suspendible magnetic particles in a liquid medium, and a magnetic circuit provided with a magnetic field creating means in the configuration of a symbol, the said symbol configuration being positioned in magnetizing relation to the magnetizable particles in said holder.

2. In the system of claim 1, means for energizing said magnetic circuit to create the magnetic field in said symbol configuration, the magnetizable particles in said liquor medium being caused thereby to migrate towards and agglomerate at the created magnetic field of said symbol configuration to produce a viewable change in said symbol system.

3. The system of claim 1 in which the suspension is a colloidal suspension.

4. In the system of claim 1, a plaque in advance of said symbol configuration bearing an image of said symbol configuration visibly delineated against a contrasting background, the plaque being located so that the image of said symbol is arranged in juxtaposition to said symbol configuration, means for normally agglomerating said magnetic particles away from said configuration, and means for magnetizing said magnetic circuit to create the magnetic field in said symbol configuration, the magnetizable particles in said holder being caused thereby to migrate towards and agglomerate at the created magnetic field to render the delineated image of said symbol configuration invisible against said background.

5. A magnetic-field-operable symbol system comprising a viewable holder containing suspendible magnetic particles in a fluid medium, an electro-magnetic circuit, the magnetic circuit of which terminates in magnetic poles which define a symbol configuration, the said symbol configuration being positioned in magnetizing relation to the magnetizable particles in said holder, and means for operating the electro-magnetic circuit for energizing and deenergizing the said magnetic circuit, the magnetizable particles in said holder being caused upon the magnetizing of the magnetic circuit to migrate towards and agglomerate at said magnetic poles to produce a viewable change in said symbol system.

6. The system of claim 5, in which the magnetic particles are normally suspended in said liquid medium, the magnetizable particles in said suspension being caused by the energizing of the magnetic circuit to migrate towards and agglomerate at the created magnetic field to render the symbol system visibly effective.

7. In the system of claim 5, a plaque in advance of said symbol configuration bearing an image of said symbol configuration visibly delineated against a contrasting background, the plaque being located so that the image of said configuration is arranged in juxtaposition to said symbol configuration, and means for normally agglomerating said magnetic particles away from said symbol configuration, the magnetizing particles in said holder being caused by the energizing of the magnetic circuit to migrate towards and agglomerate at the created magnetic field to render the delineated image of said symbol invisible against said background.

8. The system of claim 1 in which the symbol configuration comprises a plurality of characters defining a signal.

9. The system of claim 5 in which the magnetic circuit comprises a core oppositely poled by ribbon elements which extend to and terminate in the poles that define the symbol configuration.

10. A magnetic-field-operable symbol system comprising a viewable container holding a suspension of magnetizable particles in a fluid medium, a plurality of separate magnetic circuits, each terminating in magnetic poles which define a symbol configuration, the symbol configurations of said magnetic circuits being positioned in magnetizing relation to the suspension in said container, and means for selectively energizing said magnetic circuits to cause the magnetizable particles in said suspension to migrate towards and agglomerate at the magnetic poles of one or the other of said symbol configurations in response to the selection.

11. The system of claim 10 in which the separate magnetic circuits form part of an electromagnetic circuit, and means for operating the electromagnetic circuit.

12. The system of claim 11 in which one of the magnetic circuits is an electromagnetic circuit and another of the magnetic circuits is an electromagnetically controlled permanent magnet circuit.

13. The system of claim 10 in which the symbol configuration for at least one of the magnetic circuits comprises a plurality of characters defining a signal.

14. The apparatus of claim 10 in which each symbol configuration comprises a plurality of characters defining a signal.

15. The apparatus of claim 10 in which at least one of the magnetic circuits comprises a core oppositely poled by ribbon elements which terminate in the poles that define the symbol configuration.

References Cited by the Examiner

UNITED STATES PATENTS 1,069,582   8/1913   Schaeffer _____ 40—52

NEIL C. READ, *Primary Examiner.*